United States Patent Office 3,816,525
Patented June 11, 1974

3,816,525
PROCESS FOR OXIDATION OF VICINAL DIOL GROUPS INTO CARBOXYL GROUPS WITH OXYGEN
Gerd Schreyer, Grossauheim, Werner Schwarze, Frankfurt, Wolfgang Weigert, Offenbach, and Horst Weigel, Bad Vilbel, Germany, assignors to Deutsche Gold- und Silber-Scheideanstalt vormals Roessler, Frankfurt am Main, Germany
No Drawing. Filed July 26, 1971, Ser. No. 166,250
Claims priority, application Germany, Oct. 28, 1970, P 20 52 815.8; Feb. 13, 1971, P 21 06 913.6
Int. Cl. C07c 51/24, 55/02, 55/18
U.S. Cl. 260—531 R                                   6 Claims

ABSTRACT OF THE DISCLOSURE

A process for oxidizing the vicinal diol groups of organic diol compounds into carboxylic groups with oxygen or an oxygen-containing gas in the presence of an inert single-phase aqueous or anhydrous organic solvent medium or a two-phase solvent system of water and an inert water-immiscible solvent, and in the presence of cobalt ions or a cobalt compound, as well as in the presence of a percarboxylic acid, wherein the cobalt ions or the cobalt compound are provided in catalytic amounts and the percarboxylic acid is present, at least at the beginning of the oxygen oxidation, in an amount which is sufficient for at least partial transformation of the cobalt ions or the cobalt compound to a higher valence.

---

This invention relates to a novel and improved method of preparing carboxylic acids by oxidizing the diol groups of organic vicinal diols, and simultaneously splitting the bond between the carbon atoms to which the hydroxyl groups are attached, with oxygen or an oxygen-containing gas in the presence of an inert single-phase or two-phase aqueous or anhydrous organic solvent system, of cobalt ions or a cobalt compound and of a percarboxylic acid.

BACKGROUND OF THE INVENTION

It is known that vicinal diols may be transformed into the corresponding carboxylic acids by means of stoichiometric amounts of silver oxide, but this method cannot be used on a large technical scale [see J. Kubias, Collection Czechoslov. Chem. Commun., *31* (1966), 1666–1676].

Another known process for cleavage of 1,2-diols and oxidation into carboxylic acids is performed with oxygen in the presence of an aprotic polar solvent and of a catalytic cobalt compound. However, this process is applicable only to certain types of diols and cannot be transferred to other types of diols. Moreover, the process is not always reproducible, and the yields of the desired carboxylic acids reach no more than 70% of theory (see G. de Vries and A. Schors, Tetrahedron Letters, *1968*, No. 54, 5689–5690). Objects of the iInventionOyhiOIR(

OBJECTS OF THE INVENTION

It is an object of the present invention to provide a technical scale process for oxidizing vicinal diol groups of a broad spectrum of organic vicinal diol compounds into carboxyl groups with simultaneous cleavage of the carbon-to-carbon bond, which produces high yields of the desired carboxylic acids.

Other objects and advantages of the present invention will become apparent as the description thereof proceeds.

THE INVENTION

We have discovered that vicinal diol groups of organic diol compounds can be more efficiently oxidized into carboxyl groups with oxygen or oxygen-containing gases in the presence of cobalt ions or a cobalt compound, and optionally in the presence of an organic solvent which is inert under the reaction conditions, if the cobalt ions or the cobalt compound are provided in catalytic amounts and the procedure is performed, at least at the start of the oxygen oxidation, in the presence of an amount of a percarboxylic acid which is sufficient for at least partial transformation of the cobalt ions or the cobalt compound into a higher valence stage.

The oxidation process according to the present invention is applicable to all acyclic or cyclic vicinal diols of the generic formula

(I)

wherein $R_1$ and $R_2$, which may be identical to or different from each other, are each hydrogen or any desired saturated or unsaturated organic radical, such as substituted or unsubstituted aliphatic, aromatic, araliphatic, alicyclic and heterocyclic radicals; or, together with each other and the carbon atoms to which they are attached, $R_1$ and $R_2$ may form a ring, especially a carboxylic ring.

The oxidation process according to the present invention may be applied particularly to internal vicinal diols of the formula

(II)

wherein $R_3$ and $R_4$ are each hydrogen, alkyl, hydroxyalkyl, alkoxyalkyl, aryl, carboxylic acid, carboxylic acid ester or carboxylic acid amide radicals.

Specific examples of vicinal diols of the formulas I and II to which the process of the instant invention may be successfully applied include, but are not limited to, the following:

Octanediol-1,2,
Decanediol-1,2,
Dodecanediol-1,2,
Octadecanediol-1,2,
Cyclooctanediol-1,2,
Cyclododecanediol-1,2,
Tetradecanediol-7,8,
α-Monalkylglycerin ethers,
1,2-Dihydroxy-tetrahydronaphthalene,
Hydrindenediol,
9,10-Dihydroxystearic acid,
9,10-Dihydroxystearic acid esters,
9,10-Dihydroxyoctadecanol,
Octanediol-4,5,
Decanediol-5,6,
Decanediol-6,7,
Decanediol-7,8,
Dodecanediol-6,7,
Tetradecanediol-7,8,
Octadecanediol-9,10,
9,10-Dihydroxystearic acid amides,
9,10-Dihydroxyoctadecanol ethers, as well as isomeric mixtures of internal and terminal aliphatic diols, and the like. All of these vicinal diols are known compounds or are accessible by known methods.

Accordingly, the oxidation of vicinal diols in accordance with the present invention makes it possible to produce a broad spectrum of organic compounds containing at least one carboxylic group, including monocarboxylic acids, dicarboxylic acids, polycarboxylic acids or partially esterified carboxylic acids, such as semi-esters.

The oxidation is carried out in the presence of an organic solvent, preferably one which is inert under the oxidation conditions; such as acetic acid; esters, particularly lower alkyl esters of acetic acid, such as ethyl acetate, n-propyl acetate, n-butyl acetate and tert.-butyl acetate; propionic acid and esters thereof; as well as benzene.

The percarboxylic acids used in the process of the instant invention may be anhydrous as well as aqueous percarboxylic acids. Examples of particular percarboxylic acids are perpropionic acid, perbutyric acid, perbenzoic acid, monoperphthalic acid and the like. However, the use of peracetic acid is preferred. The peracetic acid may also comprise other components, such as free mineral acids; that is, it may be used in the form of a so-called "equilibrium-peracetic acid."

The amount of percarboxylic acid required for the performance of the oxidation process according to the present invention should be at least such that it suffices to convert the cobalt compound or the cobalt ions into a higher valence stage, which is necessary to initiate the oxidation process with oxygen. Of course, larger amounts of percarboxylic acid may also be employed.

Most advantageously, about 0.1 to 0.3 mol of percarboxylic acid is provided per mol of vicinal diol; however, it is also possible to perform the oxidation in the presence of smaller amounts of percarboxylic acid, such as down to 0.01 mol, as well as of larger amounts, such as up to about 1.0 mol per mol of vicinal diol.

Additional amounts of percarboxylic acid may also be added in the course of the oxidation with oxygen, whereby a possible slowing of the reaction may be compensated for.

As indicated above, the oxidation according to the present invention is carried out in the presence of cobalt ions or cobalt compounds. For this purpose, a cobalt compound, especially a cobalt salt, in which the cobalt may have any desired valence, is added to the reaction solution. Most advantageously, a cobalt acetate is used or a cobalt salt of the carboxylic acid which is formed by the oxidation of the vicinal diols. These cobalt salts are provided in catalytic amounts, which should not exceed about 1 mol per 100 mols of vicinal diol starting material, and are preferably between about 0.001 mol and about 0.1 mol per 100 mols of vicinal diol starting material.

The cobalt salts are converted into a higher valence stage by the percarboxylic acids, which manifests itself visually, for example, in that the initially pinkish-red or blue color of the reaction mixture, which is imparted to it by the cobalt salt, changes to greenish-brown.

The oxidation reaction pursuant to the present invention may be carried out within a temperature range of about 10 to 110° C. The preferred temperature range for the oxidation of internal vicinal diols is from about 40° C. to about 60° C., and in all other cases the preferred range is from about 70° C. to about 90° C.

The reaction mixture resulting from the oxidation reaction according to the present invention may be worked up pursuant to conventional methods; for instance, the desired carboxylic acid resulting from the cleavage and oxidation of the vicinal diol may be isolated by fractional distillation or by crystallization. The carboxylic acid formed by the release of oxygen from the percarboxylic acid may be recovered quantitatively and then reconverted into the percarboxylic acid. The catalyst may also be recovered, such as by cementation.

A particularly advantageous embodiment of the instant invention, which may be used for the oxidation of vicinal diols which already contain at least one carboxylic acid group in the molecule, consists of using as the reaction medium a two-phase liqud system composed of water and a water-immiscible organic solvent.

More particularly, we have found that the vicinal diol groups of vicinal diol compounds comprising at least one carboxyl group in the molecule can be oxidized into carboxyl groups with oxygen or an oxygen-containing gas in the presence of an inert organic solvent medium and in the presence of catalytic amounts of cobalt ions or cobalt compounds, as well as in the presence of percarboxylic acids, by converting the said vicinal diol compounds into water-soluble alkali metal or alkaline earth metal salts and performing the oxidation in the presence of water and a water-immiscible solvent.

This particular embodiment of the oxidation process according to the present invention may, in principle, be performed under the same conditions as those described above, that is, advantageously within a temperature range of about 10 to about 100° C., preferably about 40 to about 90° C.

Examples of particularly suitable water-immiscible solvents for this embodiment are benzene, chlorobenzene and o-dichlorobenzene.

Especially suitable cobalt salts for this variation are cobalt acetate, cobalt pelargonate, cobalt naphthenate and cobalt acetylacetonate.

This embodiment of the instant invention is especially well suited for the oxidation of 9,10-dihydroxy-stearic acid and shall be illustrated with the aid of this particular exemplary internal vicinal diol compound comprising a terminal carboxyl group in the molecule. For instance, the cobalt salt is dissolved in one of the above water-immiscible organic solvents or in water, a solution of 9,10-dihydroxystearic acid in aqueous sodium hydroxide is added thereto, the mixture is heated to the reaction temperature while passing air or oxygen therethrough, and the oxidation is initiated by portionwise addition of the percarboxylic acid.

After completion of the oxidation, which may be performed at a temperature up to the boiling point of the water, azelaic acid remains dissolved in the aqueous phase as its monosodium salt. The aqueous phase may readily be separated from the organic phase; upon acidification of the former with a mineral acid, such as hydrochloric acid or sulfuric acid, free azelaic acid precipitates in substantially pure form and may be isolated by filtration.

The organic phase contains pelargonic acid as well as all of the other side products of the oxidation. After distilling off the solvent, the acid may be readily isolated by fractional distillation. The distillation residue, which may still contain small amounts of oxidizable products, can be incorporated into a subsequent starting batch.

The oxidation in the two-phase system may also be carried out in continuous fashion in a reaction tower by continuously introducing an aqueous solution of a salt, especially the sodium salt, of 9,10-dihydroxystearic acid as well as a solution of the cobalt salt in the organic solvent or also in water, and simultaneously continuously withdrawing the oxidized mixture. If necessary, the oxidation of this mixture may be brought to completion in another reactor.

The carboxylic acids obtained in this manner are purer than those produced by other procedures; this applies particularly to pelargonic acid, which is obtained as a virtually water-clear oily liquid. The yields of both azelaic acid and pelargonic acid exceed 80% of theory.

The following examples further illustrate the present invention and will enable others skilled in the art to understand it more completely. It should be understood, however, that the invention is not limited solely to the particular examples given below.

EXAMPLE 1

1250 ml. of n-butyl acetate, 316.45 gm. (1 mol) of 9,10-dihydroxystearic acid and 0.4 gm. cobalt (II)-acetate were charged into a 2-liter round bottom flask equipped with a stirrer, the mixture was heated to within a temperature range of 50 to 55° C., and then a solution of 22.8 gm. (0.3 mol) of peracetic acid in 77.2 gm. of n-butyl acetate was added dropwise thereto, whereby the color of the mixture in the flask rapidly changed from pinkish-red to dirty green. Thereafter, the introduction of oxygen into the reaction mixture through a ceramic frit at the rate of 5 liters per hour, while vigorously stirring the mixture, was begun and continued for ten hours. Subsequently, the reaction solution was evaporated at 35 and 40° C. in a vacuum of 12 mm. Hg, the residue was stirred with petroleum ether, and the crystalline residue was collected by filtration with suction, dried and recrystallized from water. 156.1 gm. (83.2% of theory) of azelaic acid, M.P. 105–106° C., were obtained. The filtrate was evaporated, and the residue was fractionally distilled at 14 mm. Hg. 127.5 gm. (86.7% of theory) of pelargonic acid passed over at 139–141° C.

The distillation residue contained, inter alia, unreacted 9,10-dihydroxystearic acid as well as monoacetyl and diacetyl derivatives thereof. After hydrolysis and corresponding purification, the recovered material may be incorporated into the starting mixture of the next oxidation batch.

EXAMPLE 2

The procedure of Example 1 was repeated, but a solution of 20 gm. of peracetic acid in 30 gm. of water was used for activation of the cobalt ions. 154 gm. (81.9% of theory) of azelaic acid and 130.5 gm. (82.7% of theory) of pelargonic acid were obtained.

EXAMPLE 3

The procedure described in Example 1 was repeated, but instead of anhydrous peracetic acid, 57 gm. of equilibrium-peracetic acid, i.e. 39.9% peracetic acid with 1% $H_2SO_4$, was used. The oxidation was performed with oxygen. 142 gm. (75.6% of theory) of azelaic acid and 127 gm. (80.3% of theory) of pelargonic acid were obtained.

EXAMPLE 4

230 gm. of tetradecanediol-7,8 were dissolved in 1250 ml. of n-propyl acetate, and then 380 mgm. of cobalt (II)-acetate and subsequently 57 gm. of aqueous 40% peracetic acid were added to the solution. The resulting mixture was heated to between 50 and 60° C. and, while maintaining that temperature range and vigorously stirring, air was introduced. After eight hours the introduction of air was discontinued, the solution was evaporated at 30° C. in a rotary evaporator, and the residue was fractionally distilled at 12 mm. Hg. 210.5 gm. (81.2% of theory) of heptanoic acid passed over at 110–114° C.

EXAMPLE 5

A mixture of internal olefins, composed of 0.6% $C_{12}$, 1.3% $C_{13}$, 53.6% $C_{14}$, 8.1% $C_{15}$, 25.4% $C_{16}$, 2.4% $C_{17}$ and 8.1% $C_{18}$ olefins, was hydroxylated with a mixture of formic acid and $H_2O_2$ into the corresponding vicinal diols (hydrolysis of intermediate products with NaOH).

237 gm. of the resulting mixture of vicinal diols were dissolved in 1 liter of tert.-butyl acetate, 400 mgm. of cobalt(II)-acetate and then 38 gm. of a solution of 40% peracetic acid in tert.-butyl acetate were added to the diol solution, and air was blown into the mixture at a temperature of 50 to 55° C. for eight hours. Subsequently, the reaction solution was evaporated in a rotary evaporator, leaving a residue weighing 228.5 gm. Gas-chromatographic analysis of the residue showed the following composition:

| | Percent |
|---|---|
| Caproic acid | 1.4 |
| Heptanoic acid | 54.8 |
| Caprylic acid | 32.6 |
| Pelargonic acid | 9.1 |
| Unidentified acids | 2.1 |

EXAMPLE 6

202 gm. of dodecanediol-1,2 were dissolved in a 1 liter of n-butyl acetate, and 0.5 gm. of cobalt undecanate was added to the solution. While stirring the resulting mixture and passing air therethrough, it was heated to between 75 and 80° C., and then a total of 67 gm. of aqueous 57% peracetic acid were added dropwise over a period of 6 hours. Thereafter, the reaction solution was evaporated in a rotary evaporator, and the residue was fractionally distilled in vacuo at 12 mm. Hg. 138.5 gm. (74.5% of theory) of undecanoic acid passed over at 158–160° C.

EXAMPLE 7

200 gm. of cyclododecanediol-1,2 were suspended in 500 ml. of tert.-butyl acetate, 0.19 gm. of cobalt(II)-acetate was added to the suspension, and the mixture was heated to 75° C. A stream of oxygen was now passed through the hot mixture, and simultaneously 67 gm. of aqueous 57% peracetic acid were added dropwise over a period of 5 hours. Thereafter, the reaction solution was cooled and then stirred for two hours at 10 to 15° C. The crystalline precipitate formed thereby was collected by filtration with suction, yielding 118.9 gm. of 1,10-decanedicarboxylic acid, M.P. 125–126° C. An additional 24.5 gm. of the dicarboxylic acid were isolated from the filtrate. Total yield: 62.3% of theory.

EXAMPLE 8

250 ml. of chlorobenzene and a solution of 0.2 gm. of cobalt(II)-acetate in 10 ml. of water were charged into the inner compartment of a jacketed cylindrical vessel having a glass frit in the bottom thereof for introducing a gas therethrough. A solution of 158 gm. of 9,10-dihydroxystearic acid in 500 ml. of 1.1 N sodium hydroxide was added to the contents of the vessel, and the mixture was heated to the reaction temperature of 50° C. by passing warm water through the outer jacket while at the same time introducing air into mixture through the glass frit at the rate of 100 liters per hour. The oxidation was then initiated by adding 30 gm. of equilibrium-peracetic acid, i.e. aqueous 39% peracetic acid with 1% $H_2SO_4$ (corresponding 0.065 mol), in small portions, whereby the contents of the vessel turned deep green. The exothermic reaction was complete after 2½ hours. The reaction mixture was cooled, and the aqueous phase was separated from the organic phase. The pH of the aqueous phase was adjusted to 2 with hydrochloric acid, whereby a precipitate was formed which was collected by filtration with suction and washed with a small amount of water, yielding 77.4 gm. (82.2% of theory) of azelaic acid, M.P. 106° C.

The organic phase was freed from solvent by evaporation, and the residue was fractionally distilled at 14 mm. Hg. 68.1 gm. (86.2% of theory) of pelargonic acid passed over at 139–142° C.

When the run was repeated, but the reaction temperature was raised to 90° C., 76.5 gm. (81.3% of theory) of azelaic acid and 67.5 gm. (85.3% of theory) of pelargonic acid were obtained.

EXAMPLE 9

The run described in Example 8 was repeated, except that 0.3 gm. of cobalt(II)-pelargonate was used as the catalyst and the oxidation was initiated with 10 gm. of per-pelargonic acid. 79.1 gm. (84% of theory) of azelaic acid, M.P. 106 to 107° C., and 66.4 gm. (83.8% of theory) of pelargonic acid. B.P. 134–136° C. at 12 mm. Hg, were obtained.

When cobalt acetylacetonate was substituted for cobalt pelargonate as the catalyst, practically the same yields of azelaic acid and pelargonic acid were obtained.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. The process of oxidizing the vicinal diol groups of an organic diol compound containing at least one car- boxyl group in the molecule into carboxyl groups, while simultaneously breaking the bond between the carbon atoms to which the hydroxyl groups are attached, which comprises the steps of converting said vicinal diol compound into a water-soluble alkali metal or alkaline earth metal salt, oxidizing said salt with oxygen or an oxygen-containing gas in the presence of a two-phase solvent system consisting of water and a water-immiscible inert organic solvent and in the presence of a catalytic amount of cobalt ions or a cobalt compound, and, at least at the beginning of the oxygen oxidation, performing the oxidation in the presence of an amount of a percarboxylic acid sufficient to at least partially convert the cobalt ions or the cobalt compound to a higher valence stage.

2. The process of claim 1, wherein said percarboxylic acid is peracetic acid.

3. A process according to claim 1, wherein the oxidation is performed at a temperature between about 10° C. and about 100° C.

4. A process according to claim 1, wherein the oxidation is performed at a temperature between about 40° C. and about 90° C.

5. A process according to claim 1, wherein said water-immiscible solvent is benzene, chlorobenzene or o-dichlorobenzene.

6. A process according to claim 1, wherein said diol compound is 9,10-dihydroxystearic acid.

References Cited
UNITED STATES PATENTS
3,711,523  1/1973  Pultinas et al. _____ 260—531 R LORRAINE A. WEINBERGER, Primary Examiner R. D. KELLY, Assistant Examiner U.S. Cl. X.R.
260—413, 523 R